United States Patent [19]
Pitchford

[11] 3,808,020
[45] Apr. 30, 1974

[54] BITUMINOUS COMPOSITIONS
[75] Inventor: Armin C. Pitchford, Bartlesville, Okla.
[73] Assignee: Phillips Petroleum Company, Bartlesville, Okla.
[22] Filed: Apr. 3, 1972
[21] Appl. No.: 240,838

[52] U.S. Cl................ 106/277, 106/283, 252/311.5
[51] Int. Cl............................................. C08h 13/08
[58] Field of Search........ 106/277, 280, 283; 94/20, 94/23

[56] References Cited
UNITED STATES PATENTS

| | | | |
|---|---|---|---|
| 3,036,015 | 5/1962 | Woodward | 106/277 X |
| 3,055,739 | 10/1962 | Doss | 106/277 UX |
| 3,123,569 | 3/1964 | Borgfeldt | 106/277 X |
| 3,366,500 | 1/1968 | Kracauer | 106/277 X |
| 3,389,090 | 6/1968 | Turk et al. | 106/277 X |
| 3,407,877 | 10/1968 | Harvey et al. | 106/277 X |
| 3,432,320 | 3/1969 | Pitchford | 106/277 |
| 3,456,732 | 7/1969 | Stratton | 106/277 X |
| 3,513,005 | 5/1970 | Bradshaw et al. | 106/277 |
| 3,511,676 | 5/1970 | Conn et al. | 106/280 |

*Primary Examiner*—Joseph L. Schofer
*Assistant Examiner*—H. J. Lilling

[57] ABSTRACT

Stable bitumen-in-water emulsions having an average particle size below about $10\mu$ are prepared by emulsifying a bitumen having dispersed or dissolved therein at least one nonionic surfactant into an aqueous phase having a pH of at least 8 and containing an anionic surfactant.

8 Claims, No Drawings

BITUMINOUS COMPOSITIONS

This invention relates to bituminous compositions. More particularly, the invention relates to asphalt emulsions and to methods for preparing such emulsions.

Bituminous emulsions are widely used in the construction and repair of roads, pavements, soil stabilization, canal linings, and the like. Such emulsions are almost always of the oil-in-water type and are usually classified according to the emulsifying agent employed since the character or properties of the emulsion is dependent on the type of emulsifying agent used, i.e., anionic, cationic and nonionic. As a general rule, asphalt emulsions, regardless of the type, are generally characterized by a relatively small average particle size, i.e., on the order of 10 microns or less, with many of such emulsions having a particle size of less than 5 microns. While exhibiting a relatively small average particle size, a characteristic of the known asphalt emulsions is that the particle size distribution is relatively large with a significant amount of the asphalt particles having a size in excess of 50 microns. While such compositions have been acceptable for their intended use, the larger-sized particles can deleteriously affect storage and can otherwise contribute to problems of applying the material and the appearance of the product. For example, when such emulsions are used for sizing paper or waterproofing cellulosic material, the coarseness of the particle size of the internal phase can cause plugging of the paper-making equipment and can result in a product with dark spots on its surface which tends to be sticky or tacky. Similarly, when these emulsions are used as a paint for light protective coating of metallic or cellulosic objects, a blotchy and generally undesirable appearance is quite often obtained because of the coarse particle size. Since these results were attributed to coarse particle size, a significant amount of research has been directed toward producing asphalt emulsions characterized by a narrow distribution of average particle size. Illustrative of such methods of preparing smaller particle size emulsions are U.S. Pat. Nos. 2,481,374; 2,502,080; 3,036,015; and 3,432,320.

It is an object of this invention to provide stable bitumen-in-water emulsions. It is another object of this invention to provide bitumen-in-water emulsions characterized by a narrow distribution average particle size. It is a further object of this invention to provide an improved method of preparing bitumen-in-water emulsions. These and other objects will become more apparent from the following description of the invention.

I have discovered that valuable bitumen-in-water emulsions characterized by a narrow range of ultrafine particle size distribution can be prepared by emulsifying an oil phase comprising an admixture of bitumen and at least one polyoxyethylated alkyl phenol derivative which is at least dispersible in said bitumen into an aqueous phase having a pH of at least 8 and containing an anionic surface-active agent. Bitumen emulsions prepared in accordance with the invention are characterized by high stability and an ultrafine particle size of less than about 6 microns in diameter, preferably 0.5–3 microns or smaller, with substantially no particles greater than 10 microns, providing the emulsification procedure is carried out in accordance with the methods to be described hereinafter. It will be appreciated that there are certain procedural steps embodied in these methods and that preferred emulsions are obtained when these procedural steps are carried out. The highly stable bitumen-in-water emulsions of this invention are characterized by the unexpected ability to be diluted or let down to all strengths without creaming and exceptional stability upon storage (especially in metal containers) regardless of the degree of dilution. As a result of these and other characteristics, the emulsions of the present invention can be used in the preparation of binders, adhesives, coatings, fillers, plasticizers, soil stabilizers, sound detonators, polishes, sized paper, in waterflooding solutions, and the like.

Thus, according to this invention, at least one nonionic polyoxyethylated alkyl phenol derivative, which is at least dispersible in bitumen, is dispersed or dissolved in the selected bitumen. This material is subsequently emulsified using certain hereinafter-described anionic surface-active agents, i.e., surfactants, which are added to the aqueous phase under conditions such as to provide an aqueous phase having a pH of at least 8 prior to combining the two phases through a suitable mixing means.

Bitumens which can be emulsified in accordance with the present invention include products derived from petroleum by refining such as lubricating oils, reduced crude oil, asphalts, cracked tars, asphaltenes, resins, asphaltic oils and the like; naturally occurring asphalts (bitumens and pyrobitumens); or products obtained by blowing these materials with an oxygen-containing gas in the presence or absence of a catalyst. Particularly preferred bitumens include asphaltic cements characterized by ASTM D–5 penetration in the range of about zero to about 300 or even higher, preferably in the range of about 40 to about 300; and having softening points (ASTM D–36–26) in the range of about 90° to about 250° F., preferably in the range of about 100° to about 150° F.

The polyoxyethylated alkyl phenol compounds which are suitable for incorporation into the bitumen or oil phase in accordance with the present invention are characterized by the formula

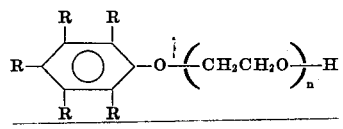

wherein each R is individually selected from the group consisting of hydrogen and alkyl radicals having from one to 25 carbon atoms, at least one of said R groups being alkyl, with the total number of carbon atoms in the sum of such alkyl radicals being not more than 25; and n is an integer in the range from about 6 to about 15. Preferred are such compounds wherein each R is individually selected from the group consisting of hydrogen or alkyl radicals having from four to 12 carbon atoms, preferentially six to 10 carbon atoms; and n is an integer in the range from about 6 to about 10. Particularly preferred are those compounds containing a single alkyl constituent of eight or nine carbon atoms, preferably in the position para to the phenolic functional groups, and having an n value in the range of 6 to 8. Preferably, the alkyl phenol derivatives are soluble in the bitumen, but it is necessary that they are, at the very least, dispersible in the bitumen.

The anionic surface-active agents which are suitable for use in the practice of the invention are selected from the group consisting of the petroleum hydrocarbon-insoluble fractions of coal-tar hydrocarbon extracts of pine wood which are saponifiable in a basic medium such as an alkali metal hydroxide or an alkaline earth hydroxide. Representative of such compounds is the product commercially available under the brand name Vinsol Resin (Registered trademark of Hercules Powder Company). Vinsol Resin is a well-known article of commerce, see U.S. Pat. No. 3,607,773, the disclosure of which is incorporated herein by reference. Vinsol Resin is a hard, brittle, dark-colored thermoplastic resin derived from pine wood and containing phenol, aldehyde and ether groups. It has a specific gravity of 1.218, a melting point of 234°–239°F., a flash point of 455°F., and an acid number 93, largely insoluble in petroleum solvents, but soluble in alcohols, ketones and esters. It is recommended for use in slow-breaking types of asphalt emulsions by Hercules Powder Company. This Vinsol Resin is a form of tall oil, and the same amount of other tall oils can be substituted with similar useful results in the practice of this invention.

Tall oil is a liquid rosin, whereas Vinsol Resin is the same material in solid form. "Tall" is Swedish for "pine." Tall oil liquid rosin, Acintol C (trademark of Arizona Chemical Company), tallol, and talleol are all the same, being a by-product of the wood pulp industry. Usually, tall oil is recovered from pine wood "black liquor" of the sulfate or kraft paper process and contains rosin acids, oleic acid and linoleic acid. Long chain alcohols and small amounts of sterols, especially phytosterol, have also been found in it. It generally is a dark brown liquid having an acrid odor similar to that of burnt rosin. Its density is 0.95 to 1 and its $N_d^{20}$ is approximately 1.5. It has an acid number 170–180, a saponification number 172–185, and an iodine number 120–188. It contains 50–60 percent fatty acids, 34–40 percent rosin acids, and 5–10 percent unsaponifiable material.

By tall oil we intend to cover the various tall oils, Vinsol Resin and Acintol C.

The novel emulsions of this invention are prepared by separately forming an oil phase comprising bitumen and at least one of the at least dispersible bitumen polyoxyethylated alkyl phenol derivatives and an aqueous phase comprising water and a saponifiable petroleum hydrocarbon-soluble fraction of a coal-tar hydrocarbon extract of pine wood. The oil and aqueous phase are then combined through a colloid mill or an equivalent mixing device. The oil phase must contain an amount of polyoxyethylated alkyl phenol derivative of at least 15 weight percent, preferably at least 17.5 weight percent, based on the weight of bitumen. As a general rule, the amount of polyoxyethylated alkyl phenol derivative will not exceed about 25 weight percent, based on the amount of bitumen; this limitation being dictated by economic considerations rather than technical. The water phase will generally contain an amount of anionic surfactant of at least 5 weight percent, based on the amount of water, and preferably of at least 10 weight percent. In addition, the water phase must exhibit a pH of at least 8, and preferably in the range of 10 to 13. The amount of anionic surfactant present in the aqueous phase will usually not exceed about 25 weight percent, again for economic reasons. Preferentially, the amount of polyoxyethylated alkyl phenol derivative present in the oil phase is equal to the amount of anionic surfactant present in the water phase. Generally, the amount of water present in the emulsions will be in the range of 30 to 80 weight percent, preferably 50 weight percent.

In forming emulsions according to the present invention, the polyoxyethylated alkyl phenol derivative is added to the bitumen, which has been heated to a temperature in the range of about 150° to about 350° F., preferably in the range of about 250° to about 300° F., and dispersed by a mechanical stirrer or similar device. The aqueous phase or soap solution is generally prepared by dissolving the normally water-soluble anionic surfactant in the appropriate quantity of water containing sufficient excess NaOH to provide a pH of at least 8 and preferably a pH of 10 to 13. The aqueous phase is then warmed to a temperature in the range of about 90° to about 200° F., preferably in the range of about 90° to about 125° F. The warm soap solution and hot oil phase are then proportioned to a colloid mill or similar mixing device to emulsify the mixture with the oil phase being added to the aqueous phase, during which working the temperature of the mixture can be in the range of about 100° to about 210° F., preferably 150° to about 200° F. The completed emulsion can then be cooled to a temperature below 150° F. before being used or transferred to storage.

The bitumen emulsions of this invention can be applied to paving, resurfacing, coating, etc., and will produce good, uniform smooth coatings. The emulsions can be mixed with aggregate, for example in the range of 0.5–5 parts emulsion to 4–10 parts aggregate, and the resulting slurry applied to the surface desired to be treated. After such application, the slurry sets up in the usual manner to provide an inherent coating. The aggregate to be used preferably has a moisture content in the range of 5 to 20 weight percent, and dry aggregate can be prewet to provide this moisture content. The emulsions of this invention being anionic emulsions can be used with electronegative aggregates such as gravel, sand and other siliceous materials. In the "slurry seal" technique, moist sand can be mixed with the asphalt emulsion to form a slurry of a consistency similar to that of Portland cement mix. This slurry can be continuously dumped from a revolving drum mixer or other suitable mixing device onto a road surface and as the paving vehicle proceeds along the road a rubber drag apron can be used to smooth the slurry to a uniform thickness. For this purpose, a graded sand aggregate containing more than 10 percent fines passing a 200-mesh sieve is preferred. For slow-setting emulsions, at least 1½ to 2 minutes will usually be required to mix the emulsion with the aggregate and spread the resulting slurry on the road surface before the emulsion breaks. In another application, the bitumen emulsion, sand, and Portland cement or diatomaceous earth can be applied to surfaces as a mixture by the "Gunite" method, which is especially suited for coating canals, reservoirs, water ponds, dam facings and the like. Such applications can be made by pneumatic-type spray equipment, such as REFRACT-ALL GUN. Glass wool, rock wool, hemp, cotton and other fibers can be added to the slurry or emulsion to provide coatings having higher tensile strength and which will not crack with shifting of the base or surface to which the coating is applied.

In the examples which follow, the emulsions in each case were prepared by charging a soap solution comprising water and an anionic surfactant to the feed tank of a colloid mill. The asphalt was heated to about 200° to 300° F., and the at least dispersible in bitumen polyoxyethylated alkyl phenol derivative was dispersed by mechanical stirring into the asphalt to comprise the oil phase. The oil phase was heated to 250° to 320° F. and added slowly to the soap solution, which had been heated to 150° to 190° F., circulating through the mill. After addition of the oil phase was complete, milling was continued for 3 to 4 minutes at about 190° F. with a stator-rotor spacing of 0.004 or 0.005 inch. After milling, the emulsions were stored and kept in containers at room temperature for a minimum of 24 hours prior to testing. Particle size distribution was determined by visual scaling with an optical microscope equipped with a precalibrated scale.

EXAMPLE

Four anionic asphalt emulsions were prepared and evaluated. The compositions of these emulsions and their properties are set forth in Table I.

TABLE I

| Emulsion | Composition, weight percent | | | |
|---|---|---|---|---|
| | 1 | 2 | 3 | 4 |
| Oil phase: | | | | |
| Asphalt, 85–100 Pen | 49.4 | 45.2 | 43.3 | 41.3 |
| Polyoxyethylated alkyl phenol derivative [a] | 2.6 | 5.0 | 7.6 | 9.9 |
| Aqueous phase: | | | | |
| Vinsol resin [b] | 2.64 | 2.7 | 2.7 | 2.7 |
| NaOH | 0.3 | 0.3 | 0.3 | 0.3 |
| Water | 45.0 | 46.8 | 46.1 | 45.8 |
| Solution pH | 10–12 | 10–12 | 10–12 | 10–12 |
| Particle size, μ: | | | | |
| Average | 3–4 | 3–4 | <3 | <3 |
| Maximum | >30 | >30 | 6 | 3–4 |

[a] 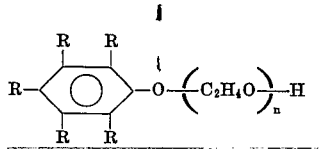

[b] A proprietary product of Hercules Powder Co. Vinsol resin is a petroleum hydrocarbon-insoluble fraction of a coal-tar hydrocarbon extract of pine wood.

The data of Table I demonstrate that emulsions prepared according to the practice of this invention (emulsions 3 and 4) are characterized by not only a small particle size but also by a narrow range particle size distribution, in contradistinction to emulsions which do contain a sufficient amount of polyoxyethylated alkyl phenol derivative.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. An oil-in-water emulsion consisting essentially of:
   an oil phase consisting essentially of bitumen and from 15 to about 25 weight percent, based on the weight of bitumen, of at least one polyoxyethylated alkyl phenol derivative characterized by the formula wherein each R is individually selected from the group consisting of hydrogen and an alkyl radical having from one to 25 carbon atoms, at least one of such R groups being an alkyl radical, and the total number of carbon atoms of such alkyl radicals being not more than 25; and n is an integer in the range of about 6 to about 15; said alkyl phenol derivative being at least dispersible in said bitumen; and
   an aqueous phase consisting essentially of water having a pH of at least 8 and from 5 to about 25 weight percent, based on the weight of water, of a saponifiable tall oil;
   said oil phase being dispersed in said aqueous phase wherein the amount of water is in the range of about 30 to about 80 weight percent of said emulsion.

2. An emulsion according to claim 1 wherein said bitumen is asphalt.

3. An emulsion according to claim 2 wherein said alkyl phenol derivative is characterized by the formula

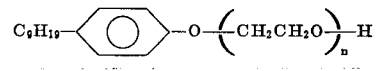

wherein n is an integer in the range of about 6 to about 15.

4. An emulsion according to claim 3 wherein said alkyl phenol derivative is characterized by the formula

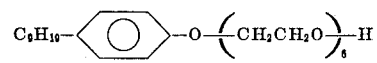

5. A process for preparing a bitumen-in-water emulsion comprising:
   forming an oil phase consisting essentially of bitumen and at least 15 weight percent, based on the weight of bitumen, of at least one polyoxyethylated alkyl phenol derivative characterized by the formula

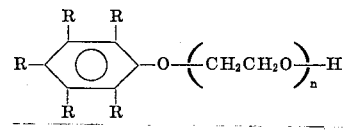

wherein each R is individually selected from the group consisting of hydrogen and an alkyl radical having from one to 25 carbon atoms, at least one of such R groups being an alkyl radical, and the total number of carbon atoms of such alkyl radicals being not more than 25; and n is an integer in the range of about 6 to about 15; said alkyl phenol derivative being at least dispersible in said bitumen;
   forming an aqueous phase consisting essentially of water and at least one saponifiable tall oil, said aqueous phase being characterized by a pH greater than 8;
   creating a stream comprising said aqueous phase; and
   combining said oil phase into said stream comprising said aqueous phase under conditions and for a time sufficient to disperse said oil phase in said aqueous phase.

6. A process according to claim 5 wherein said bitumen is an asphalt.

7. A process according to claim 6 wherein said alkyl phenol derivative is characterized by the formula
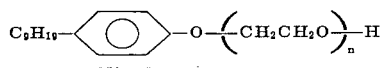
wherein n is an integer in the range of about 6 to about 15.
8. A process according to claim 7 wherein said alkyl phenol derivative is characterized by the formula
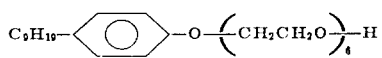
* * * * *